United States Patent [19]

Hogenson

[11] Patent Number: 4,656,979
[45] Date of Patent: Apr. 14, 1987

[54] IN TANK FUEL LINE HEATER

[76] Inventor: Milan C. Hogenson, 328 Wilson Ave., Fond du Lac, Wis. 54935

[21] Appl. No.: 773,987

[22] Filed: Sep. 9, 1985

[51] Int. Cl.[4] ...................... F02M 53/00; F02N 17/02
[52] U.S. Cl. .............................. 123/142.5 R; 123/557
[58] Field of Search ................. 123/142.5 R, 142.5 E, 123/557

[56] References Cited

U.S. PATENT DOCUMENTS 4,237,850  12/1980  Connor et al. ...................... 123/557
4,553,697  11/1985  Nothen et al. ................ 123/142.5 E Primary Examiner—Ira S. Lazarus
Attorney, Agent, or Firm—John C. Cooper, III; Fred Wiviott

[57] ABSTRACT

An in the tank fuel line heating system for heating the fuel as it is removed from the tank includes a fuel outlet conduit communicating with the port in the tank and extending downwardly into the tank to a point substantially near the bottom of the tank. A coolant circulating conduit is located adjacent the fuel outlet conduit and serves to transfer heat from the engine heated coolant to the fuel in the fuel outlet conduit. A fuel return conduit is provided adjacent the fuel outlet conduit and serves to transfer heat from the unused fuel returning to the tank to the fuel exiting the tank in the fuel outlet conduit. The coolant circulating conduit is provided with an extension that extends along the bottom of the tank and prevents ice build-up in the area.

4 Claims, 4 Drawing Figures

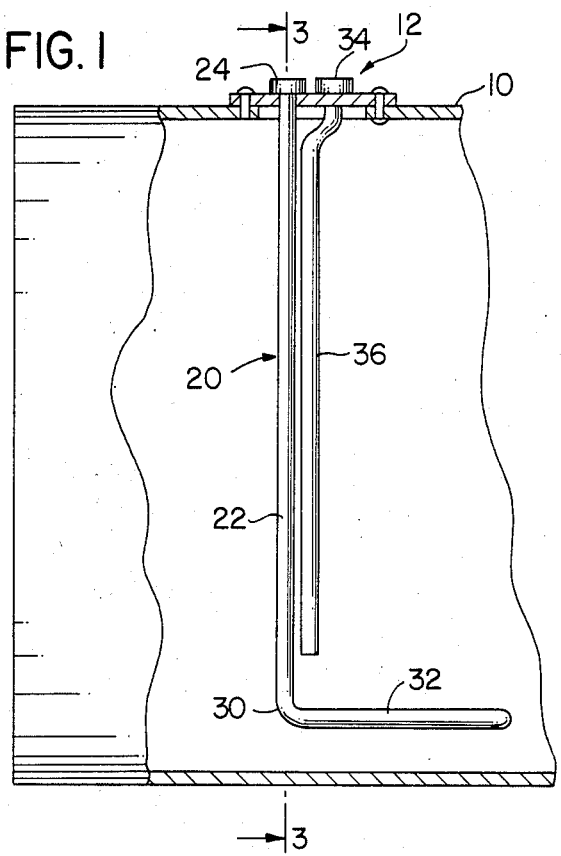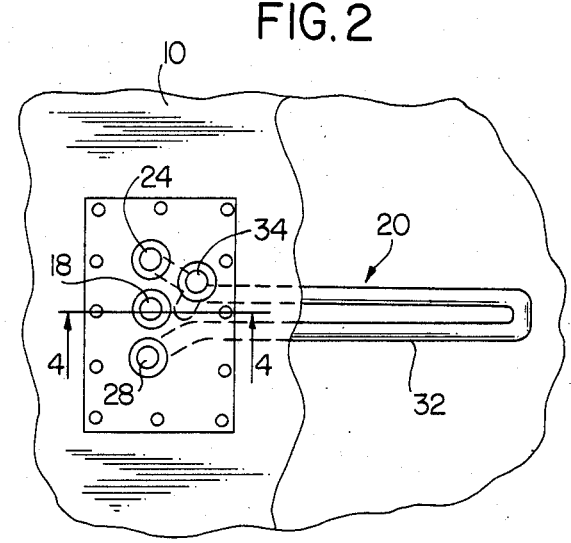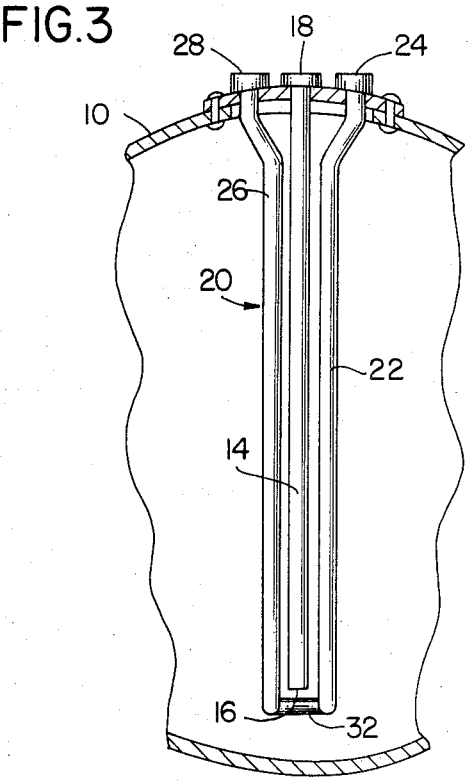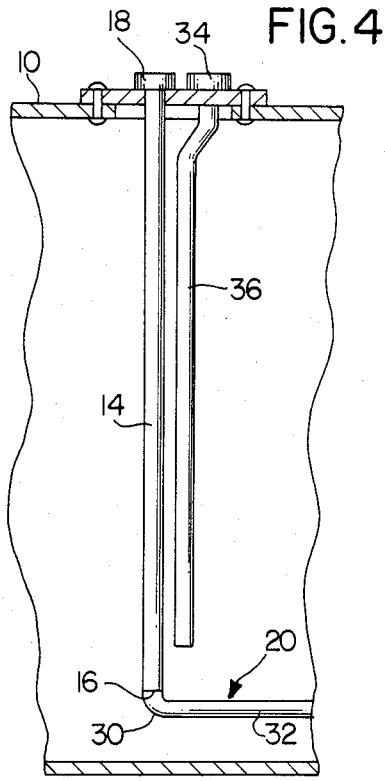

IN TANK FUEL LINE HEATER

U.S. PRIOR ART OF INTEREST

| U.S. Pat. No. | Inventor | Issue Date |
| --- | --- | --- |
| 4,286,551 | Blitz | 09-01-81 |
| 4,338,891 | Blitz | 07-13-82 |
| 4,393,851 | Gorans | 07-19-83 |
| 4,395,996 | Davis | 08-02-83 |
| 4,424,776 | Allen | 01-10-84 |

BACKGROUND AND SUMMARY OF THE INVENTION

This invention relates to a fuel line heating system and more particularly to a heating system for preheating the fuel in an outlet conduit located in the fuel storage tank.

In cooler climates, diesel engine operation has encountered a problem attributable to the formation of wax crystals, due to the parathon content of the fuel. For reasons of economy, No. 2 fuel oil is desired, but this grade is afflicted with the wax problem, which can be so sever in extremely cold temperatures as to clog the fuel line and starve the engine of fuel. To avoid this problem, No. 1 fuel (kerosene) has been recommended, but the incremental cost per gallon is prohibitive. The other solution to the problem is to provide a system for heating the fuel.

Systems such as shown in the Blitz '551 and '891 patents attempt to heat the entire fuel tank in order to prevent the waxing problem, while other systems such as that shown in the Gorans '851 patent regulate the temperature of the fuel after it has left the fuel tank. Systems such as these have inherent problems in that the Blitz systems must use a rather substantial size coil in order to heat the entire fuel tank while the Gorans system does not account for the waxing that occurs in the tank adjacent the outlet.

Other patents such as the Davis '996 patent teach the use of a separate chamber in the tank for heating and filtering the fuel and the Allen '776 patent utilizes a system that constantly circulates the fuel even when the engine is not running in order to het it.

In accordance with one aspect of the invention the in tank fuel line heating system is provided with a fuel outlet conduit that extends downwardly into the tank to a point substantially near the bottom of the tank. A coolant circulating circuit that circulates the heated engine coolant is located adjacent the fuel outlet conduit and serves to transfer heat from the engine heated coolant to the fuel in the fuel outlet conduit.

In accordance with another aspect of the invention, a fuel return conduit is provided for returning unused fuel from the engine to the tank. This conduit is located adjacent the fuel outlet conduit and extends downwardly into a tank to a point just above the inner most end of the fuel outlet conduit.

In accordance with yet another aspect of the invention, the coolant circulating conduit is provided with a portion that extends parallel to the bottom of the tank and serves to heat that area of the tank and prevent the formation of ice from any water condensate that may have formed in that portion of the tank.

The present invention thus provides a compact system that does not occupy a great deal of space in the tank and a system that will preheat the fuel as it leaves the tank through the fuel outlet conduit. Any wax buildup in the tank is thus eliminated as it is heated in the fuel tank outlet.

BRIEF DESCRIPTION OF THE DRAWINGS

The drawings illustrate the best mode presently contemplated of carrying out the invention.

In the drawings:

FIG. 1 is a side cross-sectional view of a fuel tank utilizing an in tank fuel line heating system constructed according to the invention;

FIG. 2 is a partial plan view with parts broken away of the fuel tank of FIG. 1;

FIG. 3 is a sectional view along the line 3—3 of FIG. 1; and

FIG. 4 is a sectional view along the line 4—4 of FIG. 2.

DESCRIPTION OF THE PREFERRED EMBODIMENT

As seen in FIG. 1, a generally cylindrical fuel tank 10 of the type typically used on an over the road transport vehicle is provided with an in the tank fuel line heating system 12.

Heating system 12 includes a fuel outlet conduit 14 that extends downwardly into the tank with its open end 16 terminating at a point substantially near the bottom of the tank.

Fuel outlet conduit 14 communicates with a port 18 in fuel tank 10 and provides fuel to an intenal combustion engine (not shown) by means of an outside of the tank fuel line (also not shown).

The internal combustion engine is cooled by a fluid circulation system and the heated coolant that is circulated around the engine is introduced into a coolant circulating conduit 20 located in fuel tank 10 adjacent fuel outlet conduit 14.

Coolant circulating conduit 20 includes a first portion 22 that extends downwardly along one side of fuel outlet conduit 14 from an inlet port 24 in tank 10. Conduit 20 is further provided with a second portion 26 that extends upwardly along a second side of fuel outlet conduit 14 to an outlet port 28 in tank 10.

Conduit 20 is provided with an elbow 30 located immediately below opening 16 in conduit 14 at which point conduit 20 bends at an approximately 90° angle and extends outwardly from first portion 22 and second portion 26 so as to provide a third portion 32 that extends substantially parallel to the bottom portion of tank 10. The circulation of heated engine coolant in portion 32 prevents the build-up of ice from water condensate in an area adjacent opening 16 in conduit 14. Elbow 30 also acts to generate additional heat transfer in an area immediately adjacent opening 16.

As is typical in diesel engines fuel tank 10 is provided with a return port 34 through which unused fuel is returned from the engine to tank 10. Return port 34 is provided with a fuel return conduit 36 located substantially adjacent to fuel outlet conduit 14 and extending downwardly from port 34 to a point above open end 16 of conduit 14. Conduit 36 also serves to transfer heat from the unused fuel to the fuel in outlet conduit 14. Conduit 36 terminates at a point above open end 16 so that any bubbles formed in the tank by returning fuel will not be introduced into fuel outlet conduit 14.

Various modes for carrying out the invention are contemplated as being within the scope of the following claims particularly pointing out and distinctly claiming the subject matter which is regarded as the invention.

I claim:

1. An in the tank fuel line heating system for heating the fuel as it is removed from the tank for use by a fluid cooled internal combustion engine, said system comprising:

a fuel outlet conduit communicating with a port in the upper portion of the tank and extending downwardly into the tank to a point substantially near the bottom of the tank, a coolant circulating conduit having a vertical section located substantially adjacent said fuel outlet conduit and serving to transfer heat from the engine heated coolant and the fuel in said fuel outlet conduit, wherein said vertical section is closely adjacent to and parallel to said fuel outlet conduit, a fuel return conduit for returning unused fuel from the engine to the tank said fuel return conduit located substantially adjacent and running parallel along substantially the entire length of said fuel outlet conduit and extending downwardly into the tank to a point above the bottom-most end of said fuel conduit, and wherein said fuel return conduit and said vertical section of said coolant circulating conduit substantially and closely surround said fuel outlet conduit.

2. The fuel line heating system defined in claim 1 wherein said vertical section of said coolant circulating conduit comprises a first portion extending downwardly along one side of said fuel outlet conduit from a first port in the tank and a second portion extending upwardly along a second side of said fuel outlet conduit to a second port in the tank.

3. The fuel line heating system defined in claim 2 wherein said coolant circulating conduit comprises a third portion between said first and second portions of said vertical section and extending outwardly from said first and second portions and substantially normal to said first and second portions so as to extend substantially parallel to the bottom surface of the tank.

4. An in the tank fuel line heating system for heating the fuel as it is removed from the tank for use by a fluid cooled internal combustion engine, said system comprising:

a fuel outlet conduit communicating with a port in the upper portion of the tank and extending downwardly into the tank to a point substantially near the bottom of the tank, a coolant circulating conduit located substantially adjacent said fuel outlet conduit and serving to transfer heat from the engine heated coolant to the fuel in said fuel outlet conduit, a fuel return conduit for returning unused fuel from the engine to the tank said fuel return conduit located substantially adjacent and running parallel along substantially the entire length of said fuel outlet conduit and extending downwardly into the tank to a point above the bottom-most end of said fuel outlet conduit said coolant circulating conduit comprises a first portion extending downwardly along one side of said fuel outlet conduit from a first port in the tank and a second portion extending upwardly along a second side of said fuel outlet conduit to a second port in the tank said coolant circulating conduit comprises a third portion between said first and second portions and extending outwardly from said first and second portions and substantially normal to said first and second portions so as to extend substantially parallel to the bottom surface of the tank wherein said fuel return conduit and said first and second portions of said coolant circulating conduit substantially and closely surround said fuel outlet conduit.

* * * * *